US008360439B2

(12) United States Patent
Hirt et al.

(10) Patent No.: US 8,360,439 B2
(45) Date of Patent: Jan. 29, 2013

(54) ADAPTER FOR A HAND-HELD POWER TOOL

(75) Inventors: Daniel Hirt, Kirchentellinsfurt (DE); Csaba Kiss, Arnot (HU)

(73) Assignee: Robert Bosch GmbH, Stuttgart (DE)

( * ) Notice: Subject to any disclaimer, the term of this patent is extended or adjusted under 35 U.S.C. 154(b) by 804 days.

(21) Appl. No.: 12/513,306

(22) PCT Filed: Oct. 16, 2007

(86) PCT No.: PCT/EP2007/061009

§ 371 (c)(1), (2), (4) Date: May 1, 2009

(87) PCT Pub. No.: WO2008/068100

PCT Pub. Date: Jun. 12, 2008

(65) Prior Publication Data

US 2010/0108338 A1 May 6, 2010

(30) Foreign Application Priority Data

Dec. 8, 2006 (DE) ......................... 10 2006 057 927
Feb. 8, 2007 (DE) ......................... 10 2007 006 329

(51) Int. Cl.
*B23B 31/107* (2006.01)

(52) U.S. Cl. .......... 279/143; 279/79; 279/140; 279/23.1

(58) Field of Classification Search .................. 279/140, 279/143, 79, 23.1, 144, 145, 80; *B23B 31/107*
See application file for complete search history.

(56) References Cited

U.S. PATENT DOCUMENTS 5,533,581 A 7/1996 Barth et al.
5,951,026 A * 9/1999 Harman et al. ............... 279/143
5,954,463 A * 9/1999 Jore .......................... 408/239 R
5,984,596 A 11/1999 Fehrle et al.
6,079,716 A * 6/2000 Harman et al. ................. 279/75
6,293,559 B1 * 9/2001 Harman et al. ................. 279/75
6,550,786 B2 * 4/2003 Gifford et al. .................. 279/75
6,688,611 B2 * 2/2004 Gifford et al. .................. 279/71
6,824,141 B1 * 11/2004 Sakamaki et al. ............. 279/62
6,902,171 B2 * 6/2005 Sakamaki et al. ............. 279/62
7,008,151 B2 * 3/2006 Yaksich et al. ................ 408/240
7,134,367 B2 * 11/2006 Gehring et al. ................. 81/434
7,278,640 B2 * 10/2007 Allan et al. ..................... 279/79
7,354,230 B2 * 4/2008 Bauman .................... 408/239 R
2003/0026670 A1 * 2/2003 Temple-Wilson ............ 408/240
2004/0139822 A1 * 7/2004 Gehring et al. .............. 81/57.37
2005/0230926 A1 * 10/2005 Sakamaki et al. ............. 279/62
2005/0274230 A1 * 12/2005 Lin ............................... 81/58.3
2005/0279517 A1 * 12/2005 Hoffman et al. ................ 173/29

FOREIGN PATENT DOCUMENTS

CA 2370981 8/2002
CN 1370657 9/2002
CN 1537702 10/2004

(Continued)

*Primary Examiner* — Eric A Gates
*Assistant Examiner* — Bayan Salone
(74) *Attorney, Agent, or Firm* — Michael J. Striker

(57) ABSTRACT

The invention describes an adapter for a handheld machine tool, comprising a locking unit (40), which can be releasably and fixedly attached to a housing (10) of a handheld machine tool, and a rotatably mounted shaft (32), which can be connected in a rotationally fixed manner to a drive shaft (20) of the handheld machine tool, wherein the locking unit (40) has at least one means (42, 62) for a latching connection.

23 Claims, 6 Drawing Sheets

FOREIGN PATENT DOCUMENTS

Figure 1:
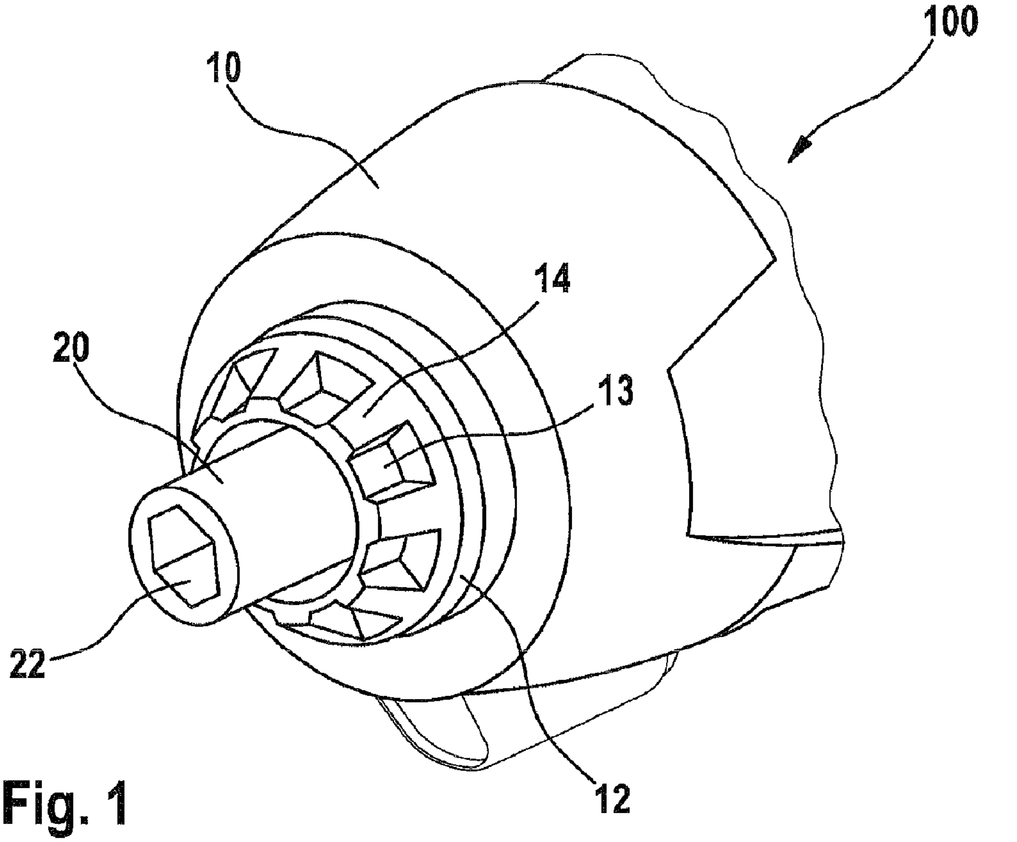

| | | |
|---|---|---|
| DE | 196 04 169 | 8/1997 |
| DE | 101 09 956 | 11/2001 |
| EP | 1 236 538 | 9/2002 |
| FR | 2 155 064 | 5/1973 |
| GB | 2 310 392 | 8/1997 |
| GB | 2 396 131 | 6/2004 |
| JP | 9-216178 | 8/1997 |
| RU | 2 189 305 | 9/2002 |
| RU | 2260148 | 9/2005 |
| SU | 1611615 | 12/1990 |
| SU | 1 639 946 | 4/1991 |
| WO | 92/20491 | 11/1992 |
| WO | 97/16123 | 5/1997 |

* cited by examiner

ADAPTER FOR A HAND-HELD POWER TOOL

BACKGROUND INFORMATION

The present invention relates to an adapter for a hand-held power tool, according to the preamble of claim 1.

To increase the number of possible applications of a hand-held power tool, e.g. as a screwdriver or a drill/driver, it is known from the related art to attach an adapter to the hand-held power tool. The adapter may be, e.g. an angled adapter, the output shaft of which is situated at an angle to the drive shaft of the hand-held power tool. Eccentric adapters that include an output shaft which extends parallel to the drive shaft of the hand-held power tool and is offset relative thereto are also known. The output shaft of the adapter drives an insertion tool, e.g. a screwdriver bit or a drill bit, which is accommodated in a tool fitting of the adapter.

Various types of fastenings are known for detachably installing an adapter on a housing of a hand-held power tool. Conventional adapters are fixedly clamped to a collar of the housing of the hand-held power tool. An additional tool is required for this.

An alternative type of fastening for an adapter is known from DE 101 09 956 A1. The front attachment described therein may be clamped to the housing of a hand-held power tool in the axial direction using a bayonet connection device that is concentric to the drive shaft.

DISCLOSURE OF THE INVENTION

The present invention is directed to an adapter for a hand-held power tool that is equipped with a rotatably supported shaft and a locking unit. The shaft may be non-rotatably connected directly or indirectly to a drive shaft of the hand-held power tool.

The shaft of the adapter may be equipped, e.g. with a tool fitting for receiving an insertion tool, e.g. a screwdriver bit, thereby enabling the insertion tool that may be accommodated in the tool fitting to be driven via the shaft. The locking unit of the adapter may be attached to a housing of a hand-held power tool in a detachable and stationary manner. It is provided that the locking unit is equipped with at least one means for establishing a detent connection. The detachable, form-fit connection of the adapter to a housing of a hand-held power tool therefore takes place, according to the present invention, via a detent connection. In particular, this is an elastic detent connection having at least one elastic detent means. A detent connection has the advantage that it is easy to handle, since an additional tool is not required to install or release the adapter.

The simple handling of the detent connection is realized, in particular, in an embodiment in which the at least one detent means is designed to latch into place automatically, i.e. without any further manual actuation of the detent means or another means. This means that, when the adapter is being installed axially on the housing of a hand-held power tool, the at least one detent means engages in a latching manner in corresponding means on the housing of the hand-held power tool. The detent connection between the adapter and the housing of the hand-held power tool becomes effective in a fully automatic manner (autolock function), i.e. without requiring any further manual intervention or the use of another tool. This may take place, e.g. using an elastic detent connection in such a manner that, when the adapter and the hand-held power tool are joined, an elastic detent means is forcibly guided against the force of the elastic detent means and engages with a corresponding means on the housing of the hand-held power tool, e.g. a recess. The elastic detent means may be, e.g. an elastic latch hook having an oblique contact face which interacts with a corresponding oblique contact face on the housing of the hand-held power tool in a manner such that, when the adapter is being installed on the housing in the axial direction, the elastic latch hook automatically becomes loaded and snaps or latches into a recess in the housing.

A further advantage of a detent connection is that the detent means may snap or latch into corresponding means on the housing of the hand-held power tool in an audible manner, thereby ensuring that the operator of the hand-held power tool hears a “click” which signals that the adapter is locked together with the hand-held power tool completely and properly.

To release the detent connection and, therefore, to remove the adapter from the hand-held power tool, the at least one detent means may be actuated manually. The detent means may be installed on the locking unit in a manner such that it may be manually actuated by the operator, directly from the outside or indirectly via a release element, e.g. a release button designed as a push button, a sliding element, or the like. If an elastic detent connection is used, the operator of the hand-held power tool must apply force against the spring force of the elastic detent means in order to disengage the detent means from the corresponding means on the housing of the hand-held power tool.

According to one embodiment of the adapter according to the present invention, the at least one detent means is used to realize at least one axial attachment of the adapter to the housing of a hand-held power tool. The adapter is thereby held at least in the axial direction by the detent means. For example, an annular groove may be provided on a housing of a hand-held power tool, thereby enabling the detent means to be engaged with the annular groove when the adapter is installed on a housing of a hand-held power tool.

Various means may be provided for absorbing the forces that act on the adapter in the circumferential direction. An axially-acting detent means may be designed in a manner such that it simultaneously serves as a rotation lock. A rotation-lock detent connection of this type may be realized, e.g. using a latch hook that engages in a corresponding recess in the housing of the hand-held machine tool. The engagement of the latch hook in a corresponding recess may take place in a manner such that the latch hook is supported in the recess in the circumferential direction essentially without play. In an embodiment of this type, the forces that are directed axially and that act in the circumferential direction are absorbed by a means, namely one or more detent means.

The rotation lock may also be realized using a separate means. According to one embodiment of the adapter according to the present invention, the locking unit includes engagement means for the non-rotatable engagement with a housing of a hand-held power tool. Corresponding engagement means are provided on the housing for this purpose. The engagement means, which are assigned to one another, are fixedly situated on the locking unit of the adapter and on the housing of the hand-held power tool. In particular, the engagement means are designed in a manner such that, when the adapter is being installed on the housing in the axial direction, the engagement means of the adapter and the housing become enmeshed without any further manual actuation being required. As a result, when the adapter is installed, it is possible to establish a form-fit connection that is effective in the circumferential direction. In this embodiment of the adapter, the forces that act in the circumferential direction are transferred via the engagement means to the housing of the hand-held power tool, while the axially-acting forces are transferred by the detent means. The forces that act in the circumferential direction and the forces that act in the axial direction are therefore absorbed by different means.

The engagement means on the locking unit and on the housing of the hand-held power tool are preferably designed as a toothed ring. If the toothing of the toothed ring is designed to be particularly fine, then the adapter may be installed in practically any angular position relative to the housing of the hand-held power tool.

Basically, different embodiments may be realized as the means for establishing a detent connection. For example, the detent means itself may be elastic in design. It may also be designed to be spring-loaded, e.g. it may be designed as a spring-loaded locking bar, a hook, or the like.

The detent means may be a separate component that is installed on the locking unit of the adapter. It may also be designed as a single piece with the locking unit by integrally forming it with the locking unit. If the locking unit is made, e.g. of plastic, it is possible to integrally form one or more detent means on the locking unit, e.g. in the form of latch hooks.

In one embodiment of the adapter according to the present invention, the at least one detent means is a spring element, i.e. the detent means itself is elastic. The spring element is preferably an annular spring which is accommodated as a separate component in the locking unit.

The annular spring is designed in a manner such that it is automatically engagable with an annular groove provided in the housing of the hand-held power tool when the adapter is installed on a housing of a hand-held power tool. When the annular spring is engaged with the annular groove, the adapter is locked in the axial direction.

According to one embodiment, a first end of the annular spring is fixedly situated in the locking unit, and a second end of the annular spring is situated such that it is movable in the circumferential direction relative to the locking unit. When the second, freely movable end of the annular spring is moved in the circumferential direction away from the first, fixed end, the annular spring expands and becomes loaded. When the tension is released, the free end returns to its home position. This effect of the annular spring is used to bring about an automatic engagement. In the home position, i.e. before the adapter is installed on the housing of a hand-held power tool, the annular spring is in the tension-free state. When the adapter is installed on the housing of the hand-held power tool, the annular spring becomes loaded without further manual actuation in that the annular spring is forcibly expanded, e.g. via a projection on the housing of the hand-held power tool. The tension of the annular spring is partially released when the annular spring enters into engagement with the annular groove in the housing. The engagement of the annular spring in the annular groove results in a secure form-fit connection and prevents the adapter from becoming accidentally detached from the hand-held power tool in the axial direction.

To remove the adapter from the hand-held power tool, the operator must expand the annular spring so that it becomes disengaged from the annular groove. The annular spring may be expanded manually. For this purpose, the annular spring may be installed on the adapter in a manner such that the second, freely movable end may be actuated manually directly from the outside by the operator.

To design the release procedure to be user-friendly, it is provided in a preferred embodiment that the second, freely movable end of the annular spring is situated in a rotatably supported release ring of the locking unit. Using the release ring, the operator may manually actuate the second, movable end of the annular ring directly. The locking unit includes a body which is provided with stationary engagement means for non-rotatable engagement with the housing of the hand-held power tool. The annular spring is mounted on the body via its first, stationary end. The second, free end is supported such that it is movable relative to the body in the circumferential direction, and it is accommodated in the release ring in a freely movable manner. To accommodate the free end of the annular spring in the release ring in a freely movable manner, an open region is provided in the release ring in the form of a slot that is curved in parallel with the circumferential direction. The release ring is supported on the body such that it may rotate in the circumferential direction, the rotatability between a home position and an end position being limited by a stop in the home position and by a stop in the end position. The annular spring is in the tension-free state in the home position of the release ring before the adapter is installed on the housing of the hand-held power tool. When the adapter is installed, the annular spring is automatically loaded in that it expands, in which case the free end of the annular spring may move within the open region of the release ring. Due to the open region which is provided for the free end of the annular spring, there is no need to move the release ring, neither automatically nor by the operator. When the annular spring engages in the annular groove, the release ring is still in the home position. To remove the adapter, it is only necessary to simply rotate the release ring relative to the body, in which case the release ring may be moved up to its end position which is defined by a stop formed on the body. The free end of the annular spring is accommodated in the release ring in a manner such that the release ring carries the free end of the annular spring along when it rotates.

The annular spring is thereby expanded against its spring force until the annular spring becomes disengaged from the annular groove and may be removed from the housing of the hand-held power tool.

In an alternative embodiment, the elastic detent means (spring element) is designed not as an annular spring but as one or more leaf springs. The at least one leaf spring is automatically engaged with suitable engagement means, e.g. an annular groove, when the locking unit is installed on a housing of a hand-held power tool. An elastic hook is formed on the leaf spring, which audibly engages in the annular groove when the adapter is installed on a housing of a hand-held power tool. A first end of the leaf spring is fixedly situated in the locking unit, while a second end of the leaf spring, which is designed as a hook, is situated such that it is movable in the radial direction relative to the locking unit. When the adapter is installed, the hook of the leaf spring is guided radially outwardly along an oblique contact face of the housing, thereby loading the leaf spring against its spring force.

In this embodiment, the locking unit also includes a locking ring which is rotatably situated in the locking unit. The locking ring may be moved into a locking position or into a release position by rotating it manually. In the locked position, the locking ring prevents the adapter from accidentally becoming detached from a housing of a hand-held power tool. In the release position, the locking ring allows the adapter to be removed from a hand-held power tool. This is attained, e.g. in that the locking ring includes radially inwardly pointing locking projections which, when in the locking position, are situated opposite the at least one leaf spring in the radial direction, thereby preventing the second end of the leaf spring from moving radially toward the outside against the force of the spring. In the release position, however, an open space which permits the second end of the leaf spring to move radially toward the outside against the force of the spring is situated opposite the at least one leaf spring in the radial direction. To install and remove the adapter, the locking ring must be moved into the release position.

When the adapter is installed on a housing of a hand-held power tool, a drive shaft of the hand-held power tool is also non-rotatably connected to a rotatably supported shaft of the adapter. The non-rotatable connection may be established directly. For this purpose, the drive shaft includes, e.g. a polygonal recess on its free end. A corresponding polygonal projection which is accommodated by the polygonal recess in a form-fit manner is formed on the shaft of the adapter. When the adapter is installed, it is therefore possible to non-rotatably connect the dirge shaft and the shaft of the adapter without additional manual actuation. To ensure that the hand-held power tool may als be used without the adapter, the polygonal recess on the end face of the drive shaft is designed such that it may also function as a receptacle for an insertion tool, e.g. a screwdriver bit. The non-rotatable connection may also be established directly via a transmission, e.g. a bevel gear, or a coupling, e.g. an overlatching coupling. The adapter then includes an input shaft and an output shaft. The input shaft and the output shaft are connected to one another in a driving manner via a transmission or a coupling. In this embodiment, the output-side end of the drive shaft and the input-side end of the input shaft are provided with corresponding means for creating a form-fit, non-rotatable connection. When an adapter of this type is installed on a hand-held power tool, the input shaft and the output shaft of the hand-held power tool are joined in a non-rotatable manner.

The shaft of the adapter may also include, on its output-side end, a tool fitting for accommodating an insertion tool, e.g., a screwdriver bit or a drill bit. The tool fitting may be a simple recess on the end face of the shaft. If the adapter has an input shaft and an output shaft, the tool fitting is situated on the end face of the output shaft.

The adapter may be, e.g. an angled adapter, the output shaft of which is situated at an angle to a drive shaft of the hand-held power tool, the input shaft of the adapter being connected to the output shaft via a bevel gear.

The adapter may be, e.g. an eccentric adapter, the output shaft of which is situated parallel to a drive shaft of the hand-held power tool, and offset relative thereto.

The adapter may also be, e.g. a torque adapter via which the operator of the hand-held power tool may adjust the maximum torque.

A further object of the present invention is a hand-held power tool that includes an adapter according to the present invention. The hand-held power tool may be a cordless or mains-connected screwdriver, drill, drill/driver, or the like.

The present invention is explained in greater detail below with reference to the attached drawing.

FIG. 1 shows a section of a hand-held power tool comprising a drive shaft and a tool fitting, in a perspective view.

Figure 2:
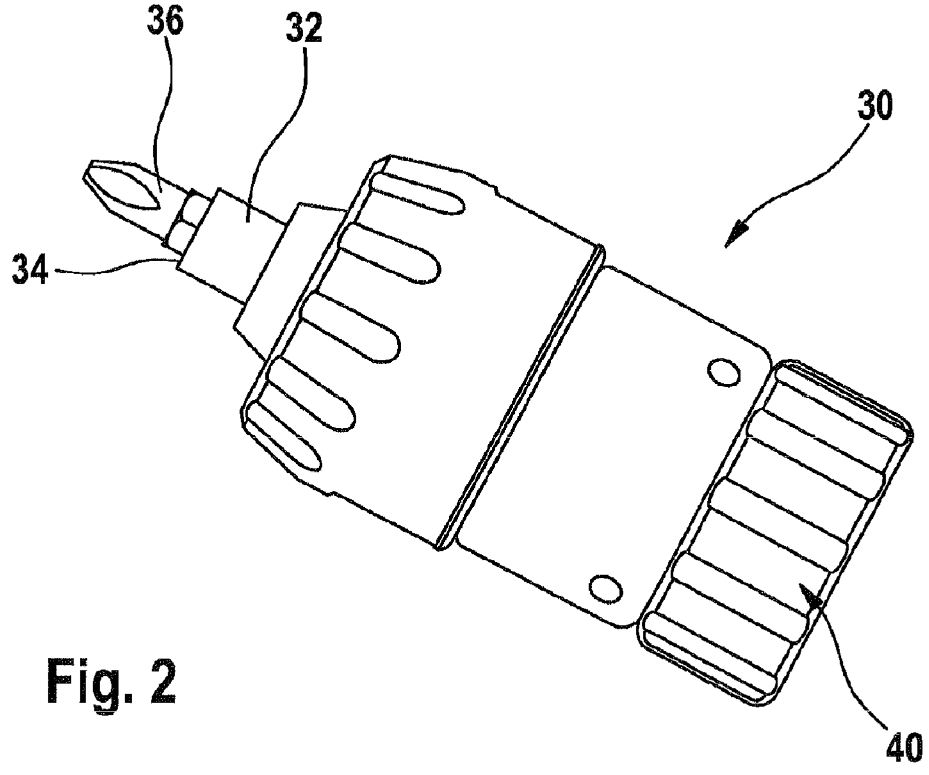
Figure 3:
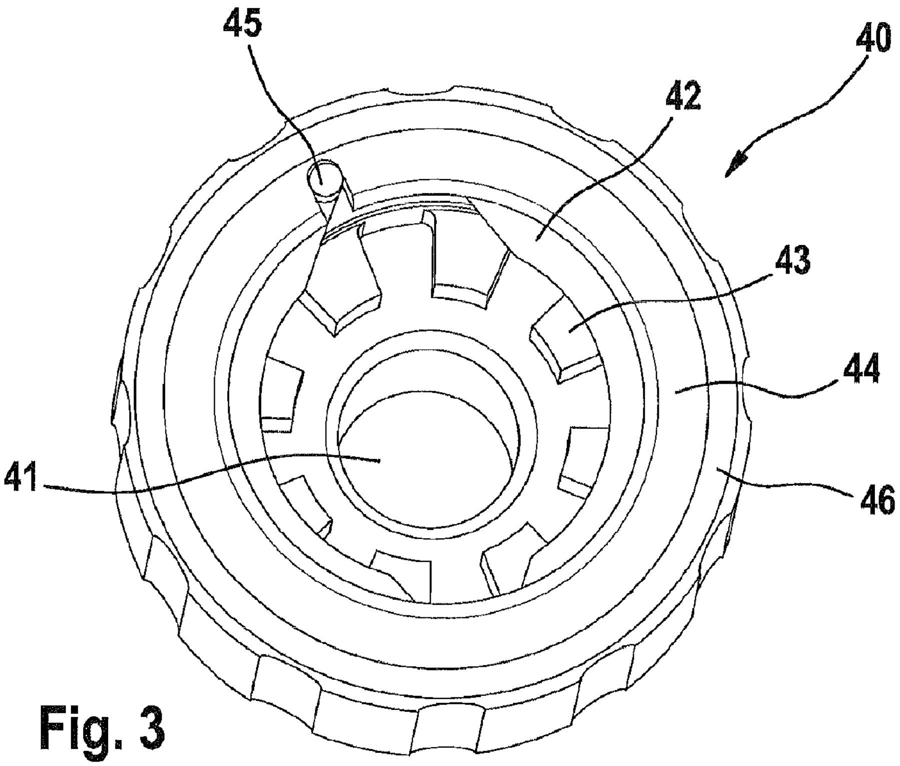
Figure 4:
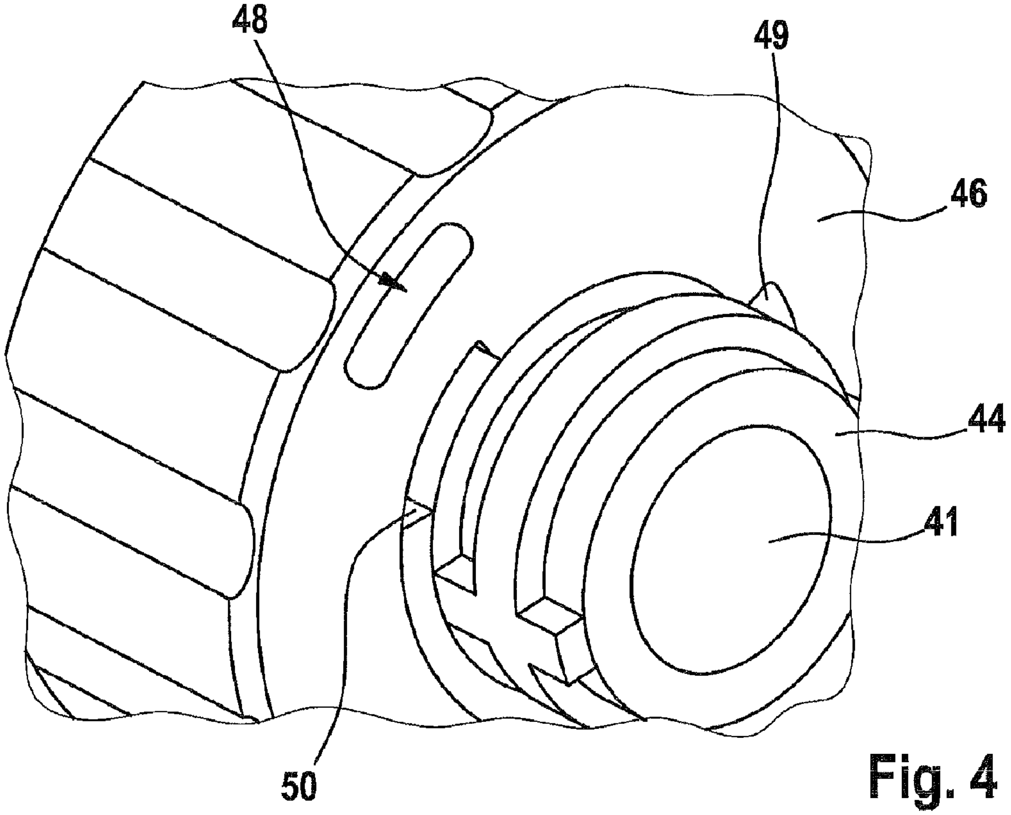
Figure 5:
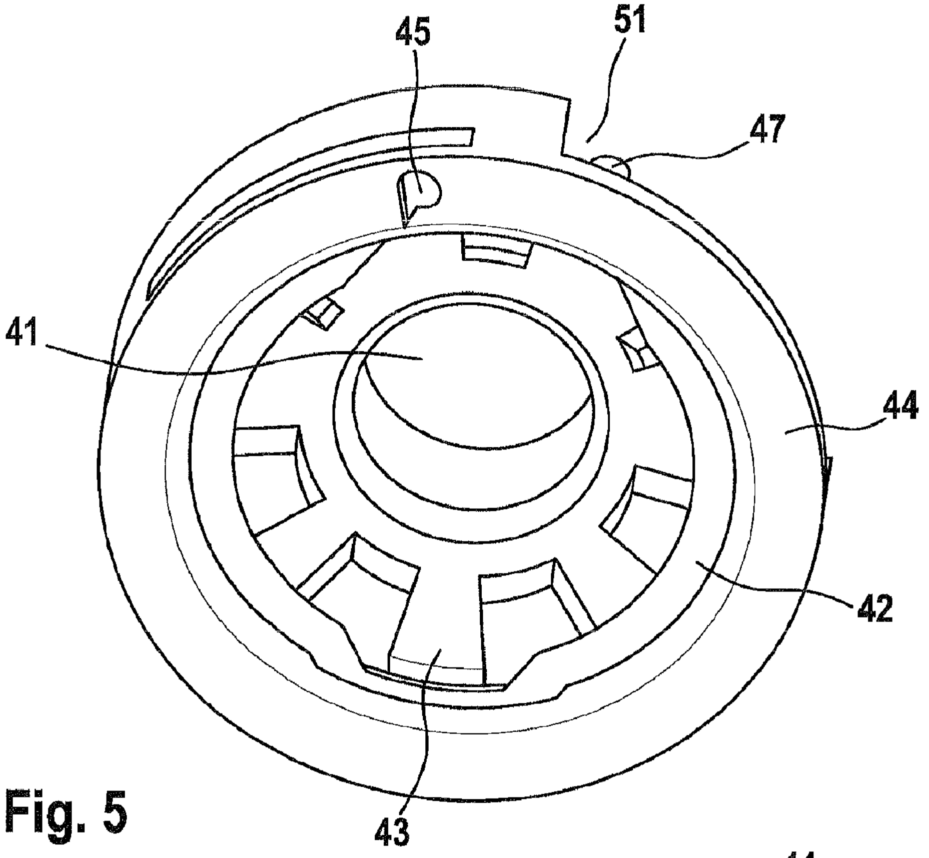
Figure 6:
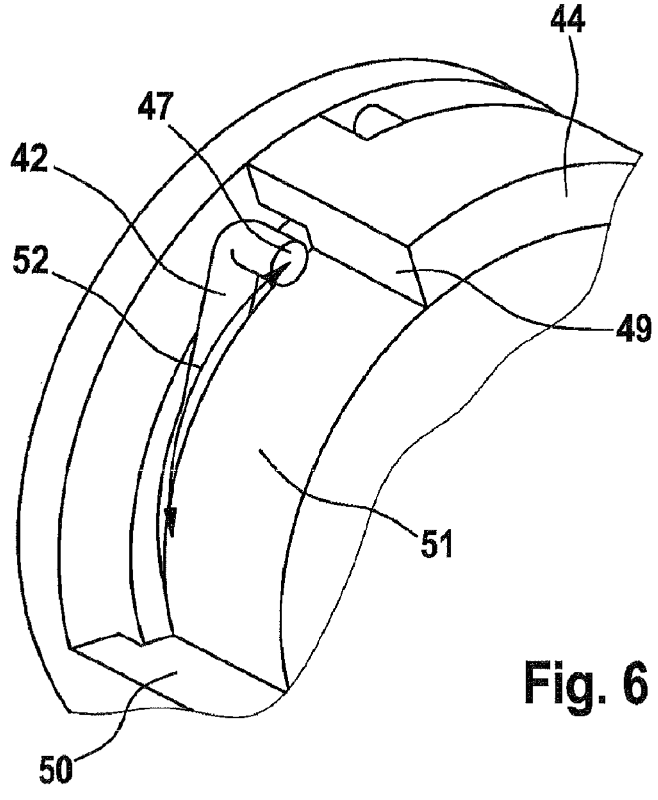
Figure 7:
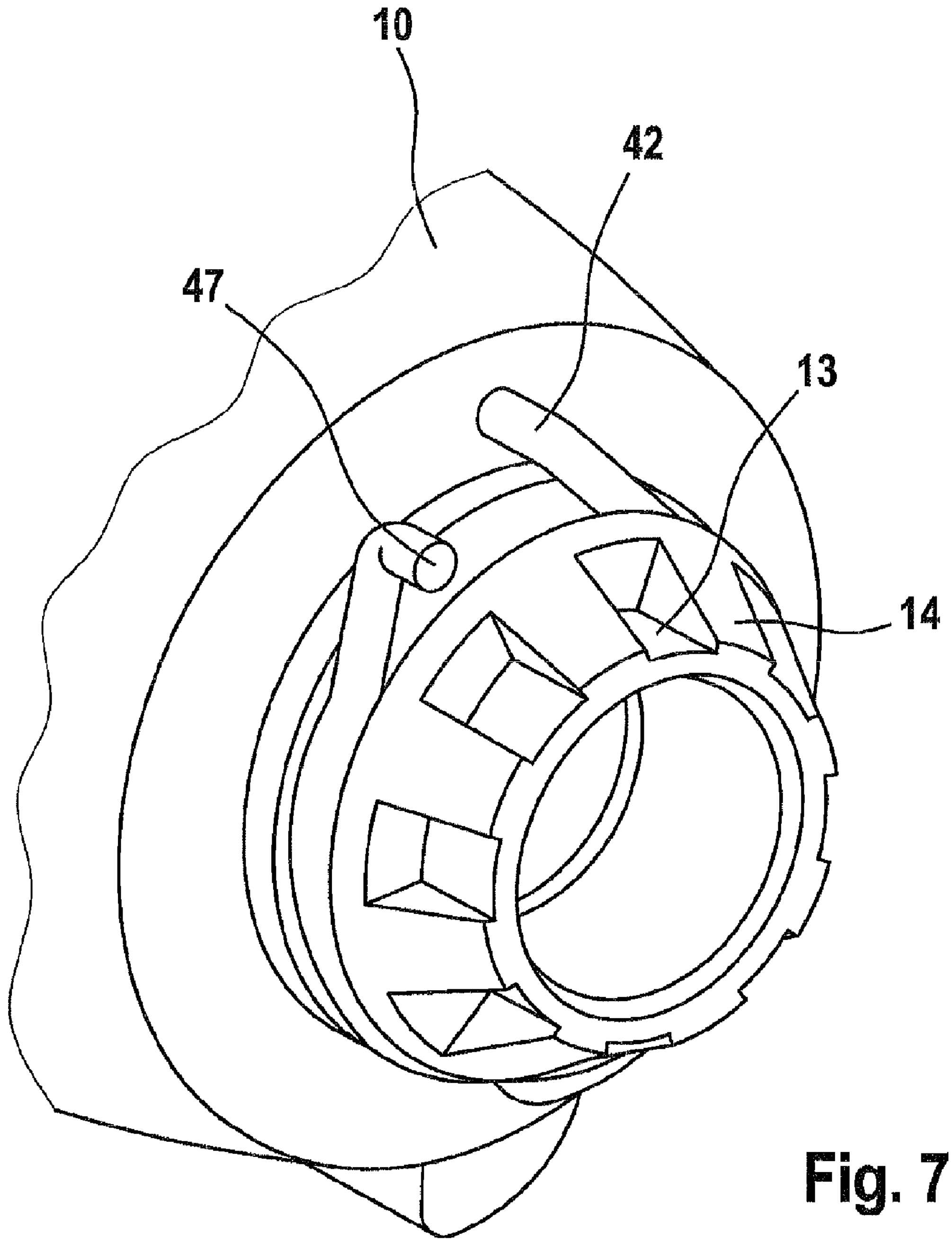
Figure 8:
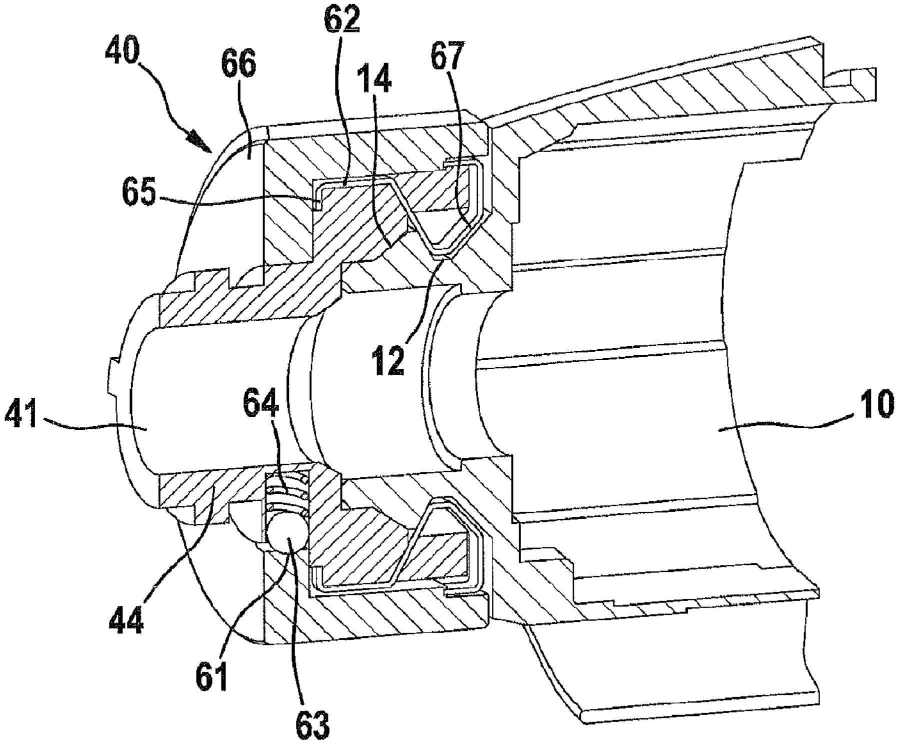
Figure 9:
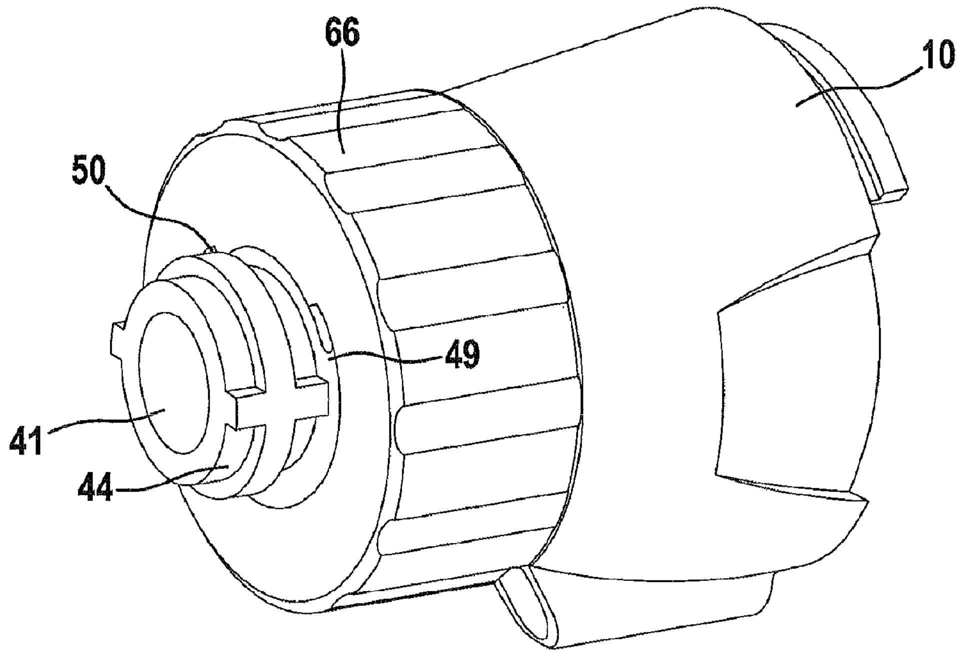
Figure 10:
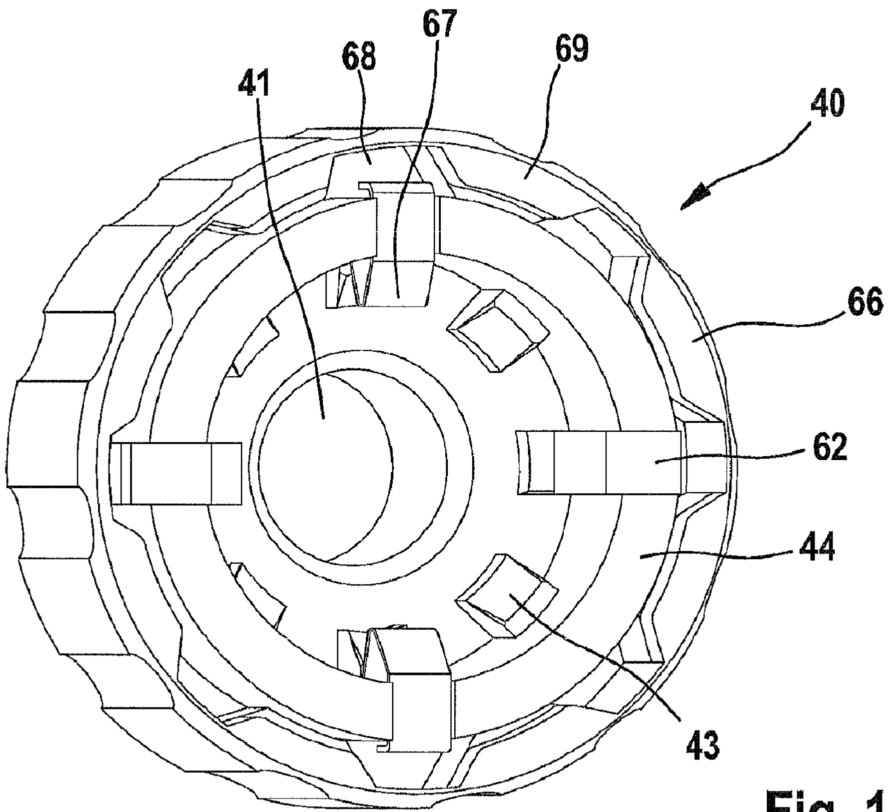
Figure 11:
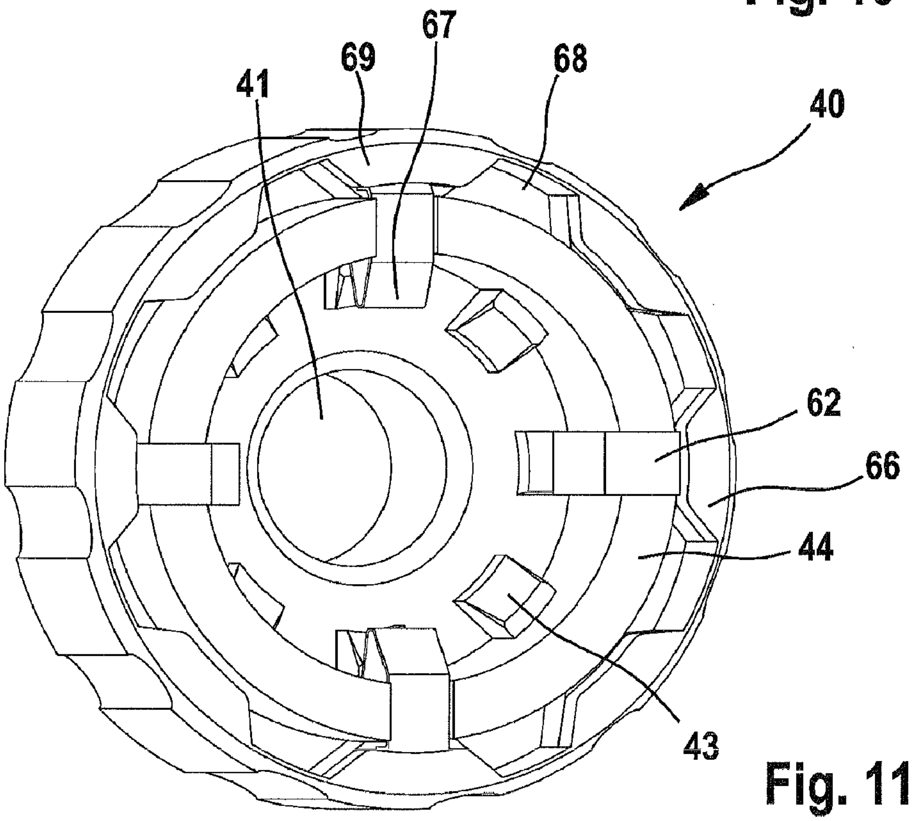

FIG. 2 shows a side view of an embodiment of an adapter according to the present invention, comprising a shaft and a locking unit FIG. 3 shows an embodiment of a locking unit which is composed of a body, an annular spring as the detent means, and a release ring, in a rear view FIG. 4 shows the locking unit in FIG. 3, in a front view FIG. 5 shows the locking unit in FIG. 3, without the release ring, in a rear view FIG. 6 shows the locking unit in FIG. 3, without the release ring, in a front view FIG. 7 shows a section of the housing of the hand-held power tool in FIG. 1, with the detent means in the latched-in state FIG. 8 shows a longitudinal sectional view of an alternative embodiment of a locking unit comprising a body, leaf springs as the detent means, and a locking ring FIG. 9 shows the locking unit in FIG. 8, in a perspective view FIG. 10 shows the locking unit in FIG. 8, in the release position, in a rear view FIG. 11 shows the locking unit in FIG. 8, in the locking position, in a rear view.

FIG. 1 shows a section of a hand-held power tool 100 that is suitable for receiving an adapter 30 (FIG. 2) according to the present invention. Hand-held power tool 100 shown in FIG. 1 is a screwdriver. In FIG. 1, only those parts of the hand-held power tool that are necessary in order to explain the present invention are shown. In the front—as viewed in the working direction—region, hand-held power tool 100 includes a housing 10, out of which a drive shaft 20 extends. On its end face, drive shaft 20 includes a polygonal recess 22 for receiving an insertion tool, e.g. a screwdriver bit (not depicted). Hand-held power tool 100 may be operated as such, i.e. without an adapter. For this purpose, e.g. a screwdriver bit may be inserted in recess 22 as an insertion tool.

As an example of adapter 30 according to the present invention, FIG. 2 shows a torque adapter which is used to adjust torque. The function performed by the adapter, be it an angular adapter, an eccentric adapter, a torque adapter, or any other type of adapter, plays a subordinate role in terms of the present invention. The mode of operation of the torque adapter will therefore not be described in greater detail here.

Adapter 30 includes a shaft 32 which includes, on its end face and on the output side, a recess 34 for receiving an insertion tool 36, e.g. a screwdriver bit. When adapter 30 is installed on hand-held power tool 100, shaft 32 is connected in a driving manner to drive shaft 20 of hand-held power tool 100. In the present case of a torque adapter, shaft 32 is an output shaft which is connected to an input shaft (not depicted) via an overlatching coupling (not depicted). Shaft 32 is connected directly and non-rotatably to drive shaft 20 of the hand-held power tool. The not-shown input shaft is connected directly and in a driving manner to drive shaft 20 of the hand-held power tool as soon as adapter 30 is installed on the hand-held power tool. In a simple embodiment, this may be attained, e.g. using a form-fit connection in that drive shaft 20, as shown in FIG. 1, includes a polygonal end-face recess 22, and the input shaft of adapter 30 includes, on the input side, a projection which is complementary to end-face recess 22 and which has a polygonal cross section (not shown). When adapter 30 and hand-held power tool 100 are joined, the projection of the input shaft is easily inserted into recess 22 of drive shaft 20 without any further steps being required.

Adapter 30 also includes a locking unit 40 for establishing a detachable connection to a housing 10 of a hand-held power tool 100. Adapter 30 according to the present invention is characterized by a locking unit 40 which includes at least one means 42 for establishing an elastic detent connection. A locking unit 40 of this type is basically suited for use with all possible adapters that may be detachably attached to a housing of a hand-held power tool, such as an angular adapter or a torque adapter.

Locking unit 40, in the embodiment shown in FIGS. 3 through 7, is composed of a body 44 which includes a central opening 41 for receiving drive shaft 20 of hand-held power tool 100. Body 44 is provided with engagement means 43 which, when adapter 30 is installed on housing 10, permit non-rotatable engagement with corresponding engagement means 13 on housing 10. Engagement means 43, 13, which are assigned to one another, are fixedly situated on locking unit 40 of adapter 30, and on housing 10 of hand-held power tool 100. Engagement means 43, 13 are designed in a manner such that, when adapter 30 is being installed on the housing 10 in the axial direction, engagement means 43, 13 of adapter 30 and housing 10 become enmeshed without any further manual actuation being required, thereby resulting in a form-fit connection. Engagement means 43, 13 transfer the forces that act on adapter 30 in the circumferential direction to housing 10. In the embodiment shown, engagement means 43, 13 are designed as toothed rings. Adapter 30 may therefore be installed in practically any angular position relative to housing 10 of hand-held power tool 100.

In the embodiment of locking unit 40 of an adapter 30 according to the present invention and shown in FIGS. 3 through 7, the forces that act in the circumferential direction are transferred via engagement means 43, 13 to housing 10 of hand-held power tool 100, while the axially-acting forces are transferred by detent means 42.

Detent means 42 are designed as a spring element, in the form of an annular spring. Annular spring 42 is designed in a manner such that it is automatically engaged with a circumferential, annular groove 12 in the housing when adapter 30 is installed on housing 10. When annular spring 42 snaps into annular groove 12, adapter 30 is locked in the axial direction. To illustrate the detent connection, FIG. 7 shows housing 10 of hand-held power tool 100 with engaged annular spring 42 without body 44 or release spring 46 of locking unit 40.

A first end 45 of annular spring 42 is fixedly situated in body 44 of locking unit 40, while a second end 47 of annular spring 42 is situated such that it is movable in the circumferential direction relative to body 44 of locking unit 40. When the second, freely movable end 47 of annular spring 42 is moved in the circumferential direction away from the first, fixed end 45, annular spring 42 expands and becomes loaded. When the tension is released, free end 47 returns to its home position. This elasticity of annular spring 42 is used to bring about an automatic engagement. In the home position, i.e. before adapter 30 is installed on housing 10, annular spring 42 is in the tension-free state. When adapter 30 is installed on housing 10, annular spring 42 becomes loaded without further manual actuation in that annular spring 42 is forcibly guided along housing 10. To facilitate the forcible guidance of annular spring 42 on housing 10, surfaces 14 of the teeth of toothed ring 13 are slanted in the axial direction. When annular spring 42 engages in annular groove 12 in housing 10, the tension of annular spring 42 is partially released. The engagement of annular spring 42 in annular groove 12 results in a secure form-fit connection and prevents adapter 30 from becoming accidentally detached from hand-held power tool 100 in the axial direction.

To attach adapter 30 to housing 10 of hand-held power tool 100, the operator therefore only needs to place adapter 30 and hand-held power tool 100 against one another in the axial direction in a manner such that engagement means 43, 13 engage in one another. Engagement means 42 thereby engage automatically in the corresponding means, i.e. annular groove 12 in housing 10.

To ensure that annular spring 42 may expand when adapter 30 is installed on housing 10, second end 47 of annular spring 42 is situated in locking unit 40 such that it may move freely. FIGS. 5 and 6 show that second end 47 of annular spring 42 extends into recess 51 in body 44 in a freely movable manner. As shown in the rear view in FIG. 3 and in the front view in FIG. 4, locking unit 40 also includes a release ring 46 which is situated on body 44. The view of the side of the adapter facing the housing of the hand-held power tool when in the locked state is understood to be the rear view, while the front view is the view of the side of the adapter facing away from the housing of the hand-held power tool when in the locked state.

Second end 47 of annular spring 42 is situated in release ring 46 such that it may move freely. For this purpose, as shown in FIG. 4, release ring 46 is provided with an axially continuous, open region 48 designed as a slot which is curved parallel to the circumferential direction. Second end 47 of annular spring 42 is supported in a freely movable manner in open region 48. When adapter 30 is installed on housing 10, annular spring 42 may expand in that second end 47 may move freely in open region 48. Due to open region 48 for free end 47 of annular spring 42, there is no need to move release ring 46 when adapter 30 is installed, neither automatically nor by the operator.

To remove adapter 30 from hand-held power tool 100, annular spring 42 must be expanded so that it becomes disengaged from annular groove 12. Annular spring 42 is expanded manually without the use of an additional tool. For this purpose, release ring 46 is supported on body 44 such that it may rotate in the circumferential direction, the rotatability—as shown in FIG. 4—between a home position and an end position being limited by a stop 49, 50 on body 44. When release ring 46 is in the home position, annular spring 42 is in the tension-free state before adapter 30 is installed on housing 10 of hand-held power tool 100. When annular spring 42 engages in annular groove 12 when it is installed on housing 10, release ring 46 is still situated in the home position.

To remove adapter 30 from hand-held power tool 100, it is only necessary to simply rotate release ring 46 manually relative to stationary body 44, in which case release ring 46 may be moved up to its end position which is defined by stop 50 formed on body 44. Free end 47 of annular spring 42 is accommodated in release ring 46 in a manner such that release ring 46 carries free end 47 of annular spring 42 along when it rotates. Annular spring 42 is thereby expanded against its spring force until annular spring 42 becomes disengaged from annular groove 12 and may be removed from housing 10 of hand-held power tool 100. To illustrate the motion of free end 47 of annular spring 42, FIG. 6 only shows body 44 and annular spring 42, and a double arrow 52 which indicates the displacement path of end 47 of annular spring 42.

After adapter 30 is removed, annular spring 42 presses release ring 46 via spring force back into its home position, as defined by stop 49.

FIGS. 8 through 11 show an alternative embodiment of a locking unit 40 which also includes a detent means for attaching adapter 30 to housing 10 of a hand-held power tool. In this embodiment, the detent means are designed as four leaf springs 62 which are distributed evenly around the circumference. Components that are identical or similar in FIGS. 8 through 11 are labelled with the same reference numerals as in FIGS. 3 through 7.

Similar to the embodiment of locking unit 40 shown in FIGS. 3 through 7, the forces that act in the circumferential direction are transferred via engagement means 43, 13 to housing 10 of hand-held power tool 100, while the axially-acting forces are transferred by detent means 62. When the detent means are designed as leaf springs 62, it would also be possible for leaf springs 62 to absorb not only the axial forces but also the forces that act in the circumferential direction, provided that leaf springs 62, when in the engaged state in housing 10, are fixed essentially without play in the circumferential direction (not depicted).

Four spring elements designed as leaf springs 62 are provided as detent means in FIGS. 8 through 11. Four leaf springs 62 are distributed essentially equidistantly around the circumference of body 44 of locking unit 40. Leaf springs 62 are designed in a manner such that they automatically engage with corresponding means—which is a circumferential, annular groove 12 in this case—in the housing when adapter 30 is installed on housing 10. When leaf springs 62 snap into annular groove 12, adapter 30 is locked in the axial direction.

A first end 65 of leaf spring 62 is fixedly situated in body 44 of locking unit 40, while a second end 67 of leaf spring 42 is situated such that it is movable in the radial direction relative to body 44 of locking unit 40. Second end 67 of leaf spring 62 is designed as a hook. When the second, freely movable end 67 of leaf spring 62 is moved outwardly in the radial direction, leaf springs 67 become tensioned. When the tension is released, free end 67 returns to its home position. This elasticity of leaf springs 62 is used to bring about an automatic engagement. In the home position, i.e. before adapter 30 is installed on housing 10, leaf springs 42 are in the tension-free state. When adapter 30 is installed on housing 10, leaf springs 62 become loaded without further manual actuation in that leaf springs 62 are forcibly guided along housing 10. To facilitate the forcible guidance of leaf springs 62 on housing 10, surfaces 14 of the teeth of toothed ring 13 are slanted in the axial direction. When leaf springs 62 engage in annular groove 12 in housing 10, the tension of leaf springs 42 is partially released. The engagement of leaf springs 62 in annular groove 12 results in a secure form-fit connection and prevents adapter 30 from becoming accidentally detached from hand-held power tool 100 in the axial direction.

For locking and release purposes, locking unit 40 also includes a locking ring 66 which is rotatably situated on body 44. FIG. 10 shows locking ring 66 in its release position, and FIG. 11 shows it in its locking position. The locking unit is shown in a rear view in FIGS. 10 and 11.

Locking ring 66 may be moved into the locking position or into the release position by rotating it manually. In the locked position, locking ring 66 prevents adapter 30 from accidentally becoming detached from housing 10 of a hand-held power tool. In the release position, locking ring 66 allows adapter 30 to be removed. For this purpose, locking ring 66 includes, on its inner surface, several radially inwardly pointing locking projections 69 which are distributed evenly in the circumferential direction. In the locking position shown in FIG. 11, locking projections 69 are situated opposite leaf springs 62 in the radial direction, thereby blocking a radial motion of second end 67 of leaf springs 62 toward the outside against the spring force. Leaf springs 62 are thereby prevented from disengaging from annular groove 12.

In the release position shown in FIG. 10, leaf springs 62 are situated opposite an open space 68—in the radial direction—on the inner surface of locking ring 66. Open space 68 allows second end 67 of leaf springs 62 to move radially outwardly against the spring force. When adapter 30 is pulled in the axial direction away from the hand-held power tool, leaf springs 62 become disengaged from annular groove 12, thereby enabling adapter 30 to be removed from the hand-held power tool.

To install and remove adapter 30, it is only necessary to move locking ring 66 into the release position by manually rotating locking ring 66 in the circumferential direction. The locking position and release position of locking ring 66 are each defined by a stop 49 and 50 on body 44 of locking unit 40. To hold locking ring 66 in the locking position or release position, a receptacle 61 for a spring-loaded ball 63 is provided in locking ring 66 for the locking position, with a similar receptacle 61 being provided for the release position. Only one receptacle 61 is shown in the cross-sectional view in FIG. 8. Body 44 includes a ball 63 and a coil spring 64; coil spring 64 bears against body 44, and ball 63 presses essentially radially outwardly into recess 61. Ball 63 is thereby pressed into particular recess 61 in locking ring 66 via coil spring 64 in the locked position and in the release position. This prevents locking ring 66 from becoming accidentally disengaged from its locked position or its release position.

What is claimed is:

1. An adapter for a hand-held power tool, comprising a locking unit (40) which is releasably and fixedly attachable to a housing (10) of a hand-held power tool, and a rotatably supported shaft (32) which is non-rotatably connectable to a drive shaft (20) of the hand-held power tool, wherein the locking unit (40) includes at least one spring element (42) in a form of an annular spring for establishing a detent connection, and wherein a first end (45) of the annular spring (42) is fixedly arranged in the locking unit (40) and a second end (47) of the annular spring is arranged to be movable in the circumferential direction relative to the locking unit (40).

2. The adapter as recited in claim 1, wherein the annular spring (42) is designed such that it latches into place automatically.

3. The adapter as recited in claim 1, wherein the annular spring (42) is actuated manually in order to release the detent connection.

4. The adapter as recited in claim 1, wherein the annular spring (42) secures the adapter, at least axially, to a housing (10) of a hand-held power tool.

5. The adapter as recited in claim 1, wherein the annular spring (42) is engageable in an annular groove (12) in the housing (10) when the adapter (30) is installed on a housing (10) of a hand-held power tool.

6. The adapter as recited in claim 1 wherein the second end (47) of the annular spring (42) is arranged in a rotatably supported release ring (46) of the locking unit (40).

7. The adapter as recited in claim 1, wherein the annular spring (42) is a leaf spring (62).

8. The adapter as recited in claim 7, wherein a first end (65) of the leaf spring (62) is fixedly arranged in the locking unit (40), and a second end (67) of the leaf spring (62) is arranged to be movable in the radial direction relative to the locking unit (40).

9. The adapter as recited in claim 7, wherein the locking unit (40) includes a rotatably supported locking ring (66) which, when in a locking position, prevents the second end (67) of the leaf spring (62) from moving radially.

10. The adapter as recited in claim 1, wherein the locking unit (40) includes engagement means (43) for the non-rotatable engagement with a housing (10) of a hand-held power tool.

11. The adapter as recited in claim 10, wherein the engagement means (43) is designed as a toothed ring.

12. A hand-held power tool that includes an adapter as recited in claim 1.

13. The adapter as recited in claim 1, wherein the adapter is configured as an angular adapter, an output shaft of which is at an angle to the drive shaft (20) of the hand-held power tool and wherein the input shaft is connected to the output shaft via angular gearing.

14. The adapter as recited in claim 1, wherein the adapter is an eccentric adapter, an output shaft of which is arranged offset from and parallel to the drive shaft (20) of the hand-held power tool.

15. The adapter as recited in claim 1, wherein the adapter is torque adapted for setting maximum torque.

16. An adapter for a hand-held power tool, comprising a locking unit (40) which is releasably and fixedly attachable to a housing (10) of a hand-held power tool, and a rotatably supported shaft (32) which is non-rotatably connectable to a drive shaft (20) of the hand-held power tool, wherein the locking unit (40) comprises a leaf spring (62) for establishing a detent connection, which leaf spring (62) includes a first end (65) fixedly arranged in the locking unit (40) and a second end (67) arranged to be movable in the radial direction relative to the locking unit (40), and a rotatably supported locking ring (66) which, when in a locking position, prevents the second end (67) of the leaf spring (62) from moving radially.

17. A hand-held power tool that includes an adapter as recited in claim 16.

18. The adapter as recited in claim 16, wherein the leaf spring (62) latches into place automatically.

19. The adapter as recited in claim 16, wherein the leaf spring (62) is actuated manually in order to release the detent connection.

20. The adapter as recited in claim 16, wherein the leaf spring (62) secures the adapter, at least axially, to a housing (10) of a hand-held power tool.

21. The adapter as recited in claim 16, wherein the leaf spring (62) is engageable in an annular groove (12) in the housing (10) when the adapter (30) is installed on a housing (10) of a hand-held power tool.

22. The adapter as recited in claim 16, wherein the locking unit (40) includes engagement means (43) for the non-rotatable engagement with a housing (10) of a hand-held power tool.

23. The adapter as recited in claim 22, wherein the engagement means (43) is designed as a toothed ring.

* * * * *